Patented Oct. 6, 1936

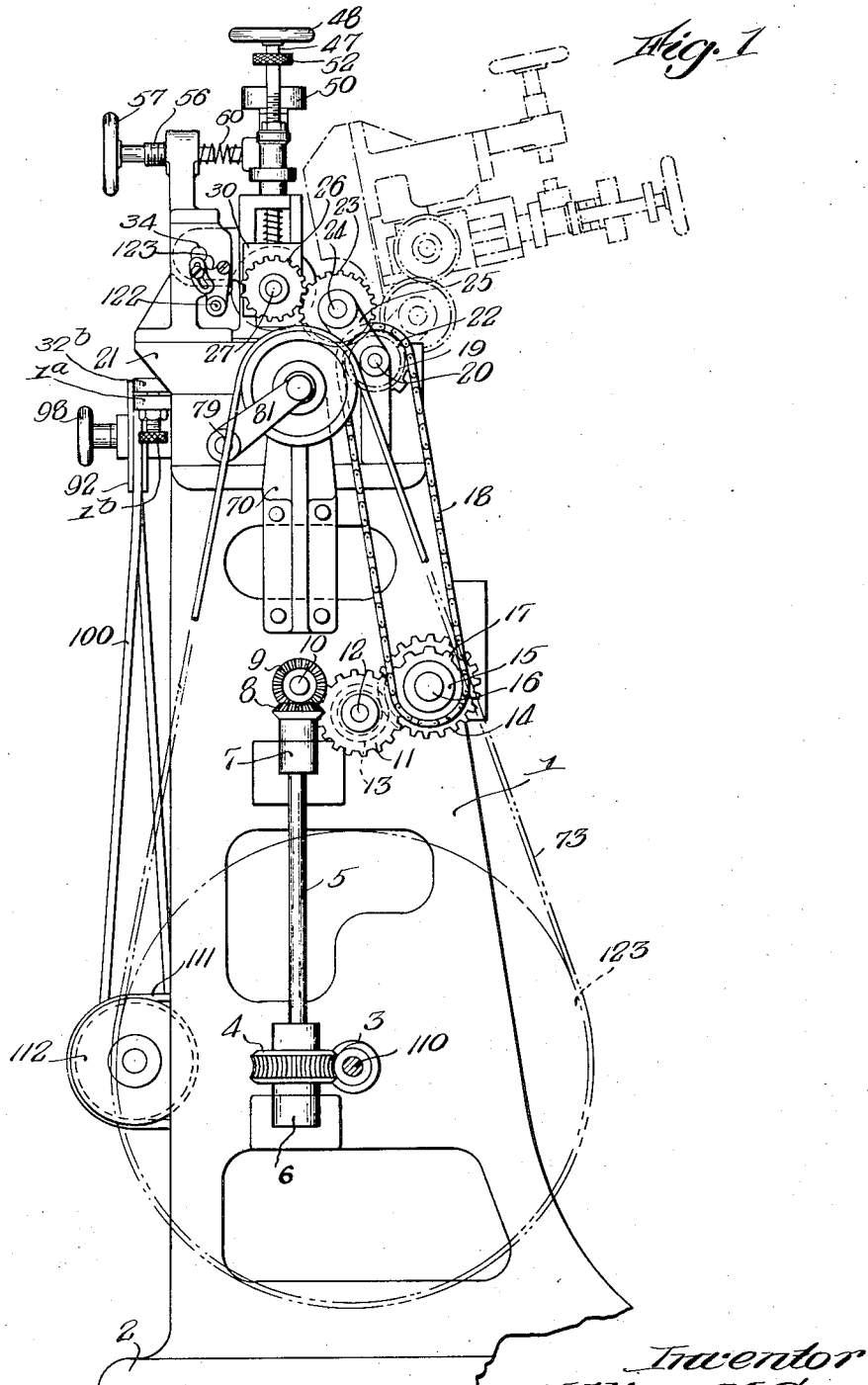

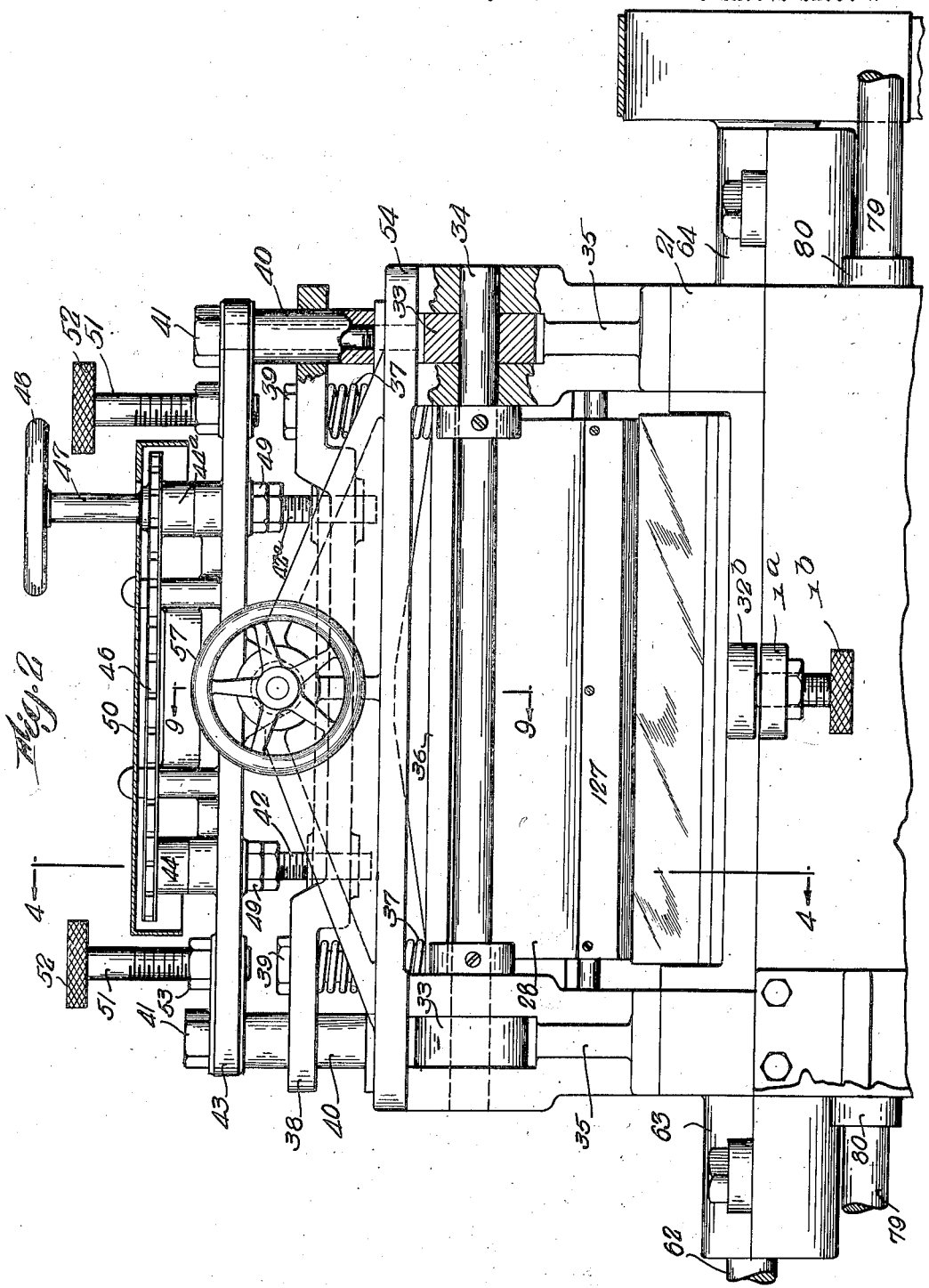

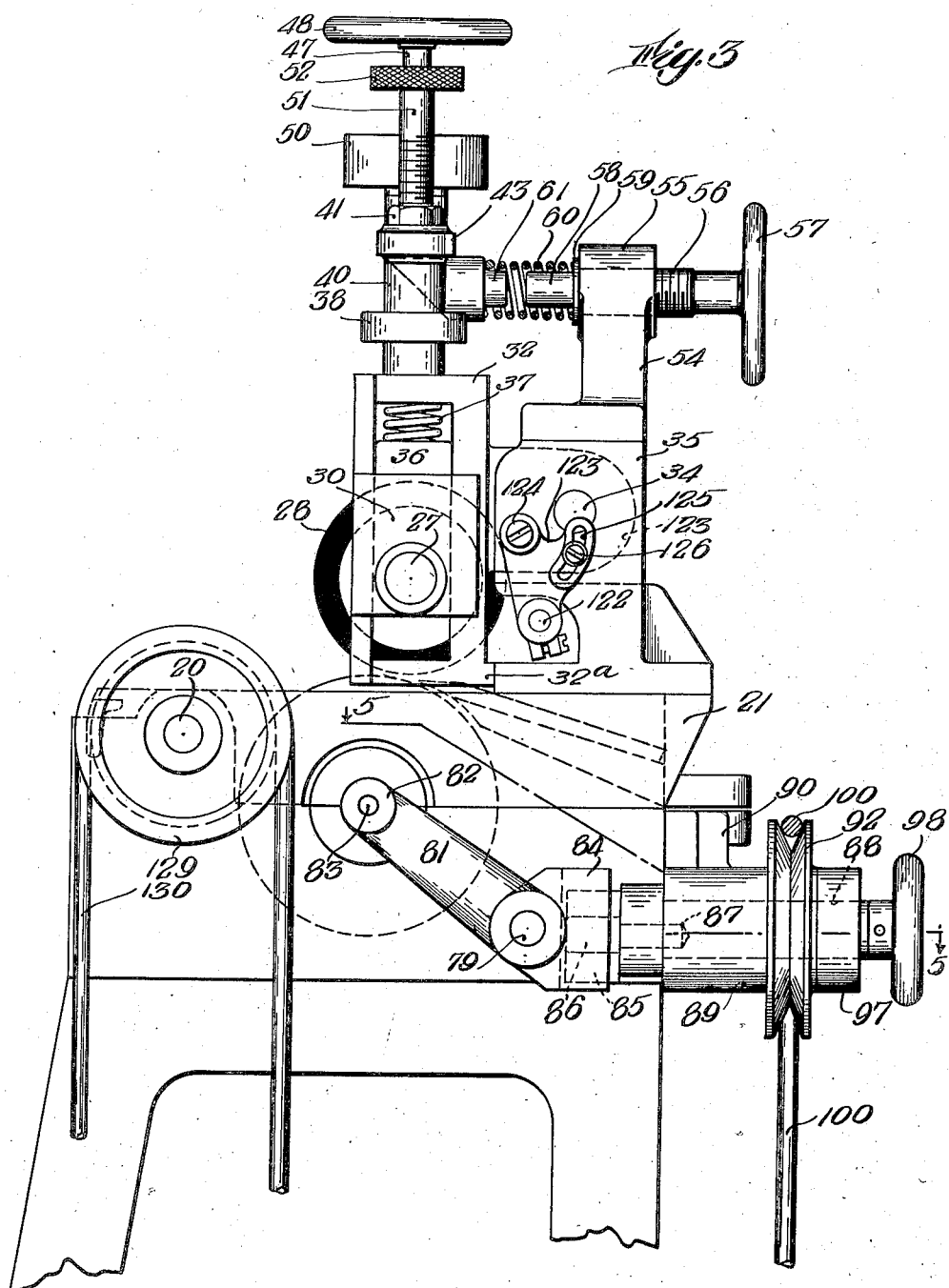

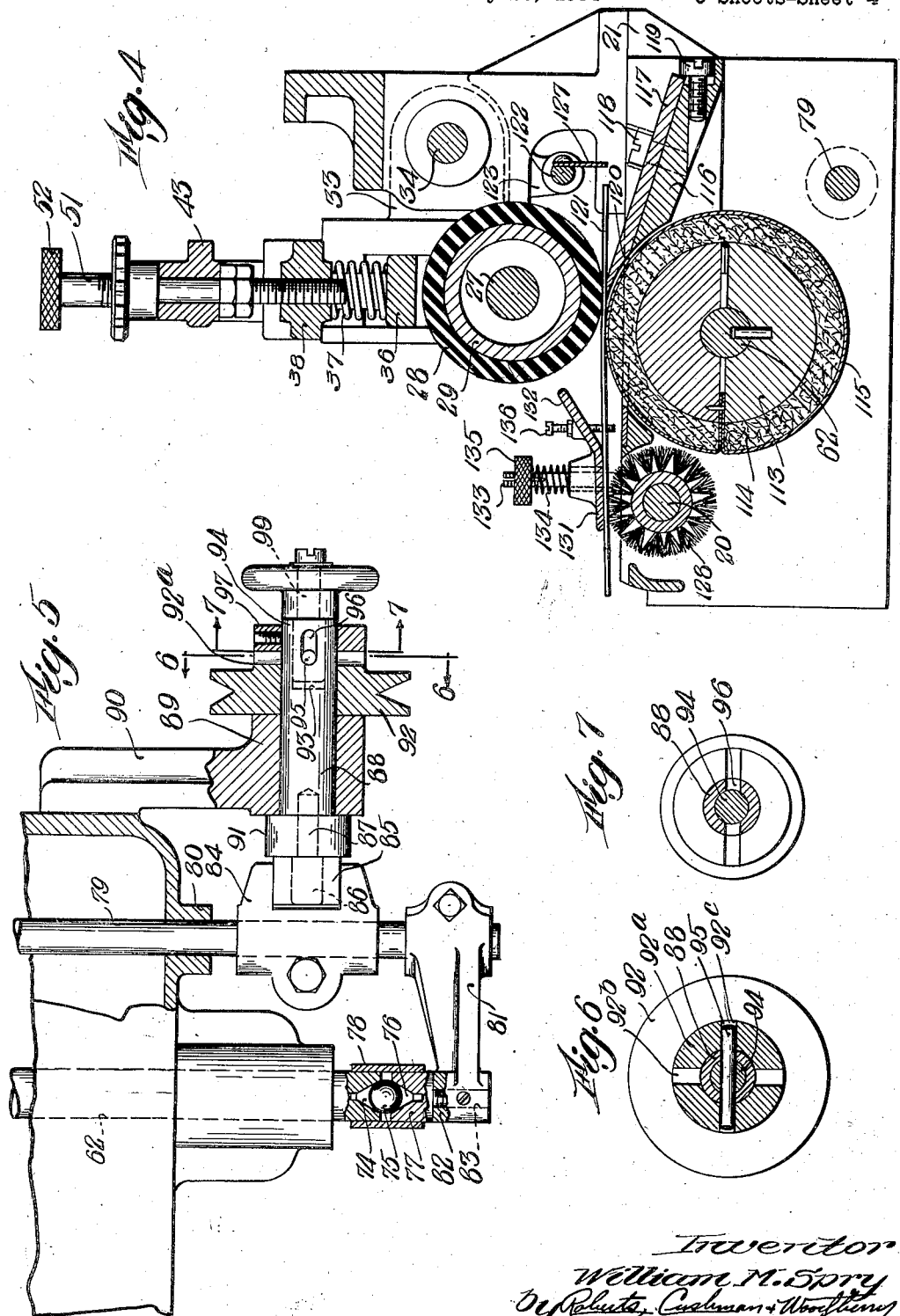

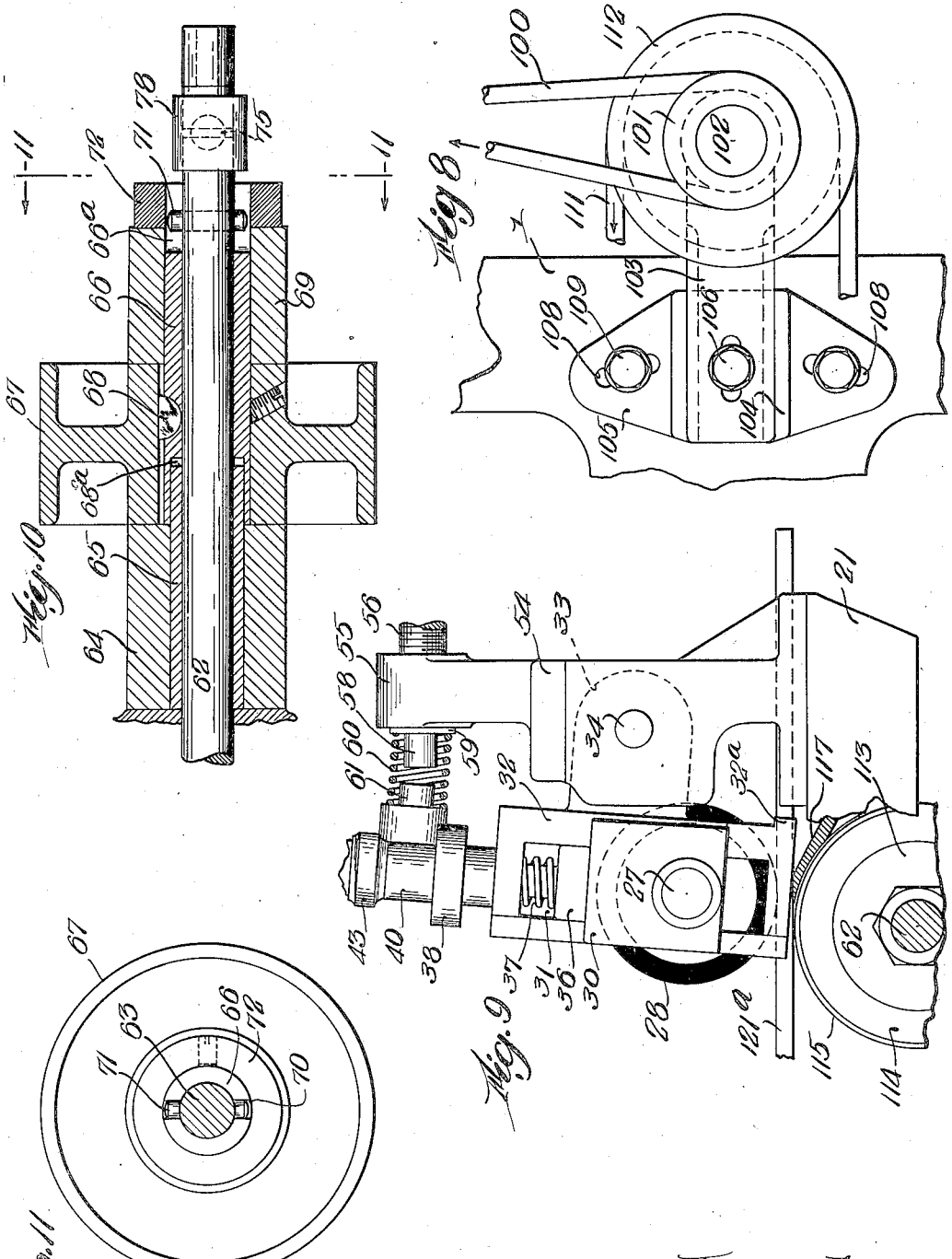

2,056,542

UNITED STATES PATENT OFFICE 2,056,542

BUFFING OR SCOURING MACHINE

William M. Spry, Beachmont, Mass., assignor to The Peerless Machinery Company, Boston, Mass., a corporation of Massachusetts Application July 24, 1934, Serial No. 736,668

27 Claims. (Cl. 51—39)

This invention pertains to buffing or scouring machines useful in forming a smooth, even surface on sheet-like material, for example, leather or the like, and particularly for smoothing such parts as soles, lifts, toe-boxes, counters, or the like used in the manufacture of shoes.

The invention relates more particularly to improvements in a machine of the kind disclosed in my Patent No. 1,952,634, dated March 27, 1934. In said patent I have described buffing or scouring means designed to produce a uniform, velvety surface substantially devoid of any distinct scratches or lines. In accomplishing the desired result, in accordance with the disclosure of said patent, the work is caused to move rapidly back and forth axially of the scouring or buffing roll while the latter is acting on it, thus avoiding the production of any distinct marks on the work due to irregularities in the scouring surface.

While the machine of my aforesaid patent is very effective for its intended purpose, so far as some types of work is concerned or for use under certain predetermined conditions, I have found that in dealing with very thin and light material, for example, insoles for women's shoes of the cheaper grades, the reciprocation of the work itself is somewhat difficult, due to its tendency to buckle when pushed laterally by the moving work guides. Moreover, when the machine is employed for buffing shoe soles which vary materially in thickness, a condition met with in cut-sole manufacturing plants, it is necessary to stop and adjust the machine quite frequently, thus materially cutting down its rate of production. In the patented machine the feed roll is resiliently pressed down against the work by means of springs, but in dealing with some kinds of work, for example, shoe counters, it is desirable to hold the feed roll rigidly at a fixed distance from the scouring roll.

The present invention has for its principal object the provision of improvements upon the patented machine, such as to provide a buffing or scouring mechanism of substantially universal application, and in particular to provide a machine which, without adjustment, will operate upon shoe soles or other parts of widely different thicknesses; which is readily adjustable for use in buffing shoe counters or the like; which will operate on the thinnest of soles without difficulty; and which at the same time will produce the same velvety surface developed by the patented machine. Other objects of the invention are to provide an improved device for actuating the scouring roll so that the latter may be reciprocated rapidly in an axial direction while rotating at high speed, thus to obtain the desired velvety surface upon the work without necessitating the lateral reciprocation of the latter; to provide improved means for tensioning a belt drive; to provide simple and effective means for locking the feed roll so that it can not retreat from the buffing roll; and so to arrange the several parts as to permit ready accessibility of the buffing roll for replacement of its abrasive surface.

Other objects and advantages of the invention will be made apparent in the following description and by reference to the accompanying drawings, in which Fig. 1 is an elevation of the right-hand side of the machine, showing the machine-head (in broken lines) tipped rearwardly to give access to the buffing roll,—the main drive pulley being omitted and the main drive shaft being in section;

Fig. 2 is an elevation, to larger scale, of the front of the machine-head, also showing the upper part of the main frame;

Fig. 3 is an elevation, to substantially the same scale as Fig. 2, showing the left side of the machine-head and the upper part of the frame;

Fig. 4 is a fragmentary vertical section, omitting certain parts, substantially on the line 4—4 of Fig. 2;

Fig. 5 is a fragmentary horizontal section substantially on the line 5—5 of Fig. 3;

Figs. 6 and 7 are sections on the lines 6—6 and 7—7, respectively, of Fig. 5;

Fig. 8 is a fragmentary elevation showing in detail a device for adjusting the tension of the belt drive for reciprocating the feed roll;

Fig. 9 is a fragmentary vertical section, substantially on the line 9—9 of Fig. 2, illustrating the way in which the feed roll automatically rises to accommodate a thick piece of work;

Fig. 10 is a fragmentary vertical section, axially of the buffing roll shaft, showing the means for transmitting power to said shaft; and Fig. 11 is a section on the line 11—11 of Fig. 10.

Referring to the drawings, the numeral 1 designates the main frame of the machine, preferably in the form of a hollow columnar casting having a broad base 2. The opposite side walls of the frame 1 are furnished with bearings for a main drive shaft 110 provided with drive pulleys and belt shifting means (not shown) but which may be of the arrangement and construction illustrated in my Patent No. 1,952,634 above referred to.

At the right-hand side of the machine the shaft 110 is furnished with a worm 3 (Fig. 1) which drives a worm wheel 4 near the lower end of a vertical shaft 5 turning in bearing brackets 6 and 7 carried by the machine frame. At its upper end the shaft 5 is furnished with a beveled gear 8 meshing with a beveled gear 9 on a stub shaft 10 projecting from the machine frame. A pinion 11 meshes with a pinion (not shown) coaxial with and fixed to the beveled gear 9,—the pinion 11 being mounted on a stub shaft 12 projecting from the machine frame and having secured to it a pinion 13 of smaller diameter which in turn meshes with a pinion 14 of larger size mounted to turn on a stub shaft 16 carried by the machine frame. A sprocket wheel 17 is secured to the pinion 14 and drives a chain 18 which also passes around a sprocket wheel 19, turning freely on the brush shaft 20. The shaft 20 constitutes a pivotal support or axis about which the machine-head 21 may be swung to the position shown in broken lines in Fig. 1 whereby to give access to the buffing roll. This shaft 20 extends transversely across the machine and is mounted to turn in fixed bearings carried by brackets projecting up from the main frame. A pinion 22 is fast to the sprocket 19 and meshes with a pinion 23 turning on a stub shaft 24 carried by a link 25 which turns freely on the shaft 20. The pinion 23 meshes with a pinion 26 fast to the feed roll shaft 27 which carries the feed roll 28. The latter may be of any suitable construction, preferably having a rigid core 29 and rubber work-engaging surface, although for various classes of work the character of the feed roll may be varied, as may be desired. In some cases this feed roll may have a recessed peripheral surface to receive portions of the work as, for example, when the machine is used for buffing the skived edges of shoe counters.

The feed roll shaft 27 is mounted in bearing boxes 30 which are guided for vertical movement in slots 31 in the opposite ends of a vertically movable feed roll shaft support 32. This support extends transversely across the machine and is furnished near its opposite ends with ears 33 which are pivoted to swing on a shaft 34 mounted in bearing brackets 35 carried by the machine-head 21 at opposite sides of the machine. These bearing brackets 35 have slotted upper portions, (Fig. 2) and the ears 33 are disposed in the slots of the respective bearing members so as to prevent transverse movement of the support 32.

A bar 36 (Fig. 9), having its ends disposed in the slots 31, rests at its opposite ends on the bearing boxes 30, and this bar is normally urged downwardly by means of coiled springs 37 which are positioned by means of bolts 39 extending axially of the respective springs, each bolt having a screw-threaded connection with a transverse, vertically movable yoke 38. This yoke is furnished at its opposite ends with openings for the reception of guide sleeves 40 which are fixed in spaced parallel relation by means of posts 41 whose lower ends have screw-threaded engagement with the machine-head. The sleeves 40 form guides for the bar 38 to control the latter in its vertical movement. This bar 38 may be moved up and down for adjustment of the tension of the springs 37, by means of a pair of screw-threaded shafts 42 and 42ᵃ having screw-threaded engagement with threaded bores in the bar 38 and whose upper parts turn freely in openings in a bridge member 43 clamped against the upper ends of the sleeves 40 by heads on the posts 41. The shafts 42 and 42ᵃ project upwardly above the bridge member 43 and carry sprocket wheels 44 and 44ᵃ, respectively, about which passes a sprocket chain 46. This arrangement ensures simultaneous rotation of the two shafts 42 and 42ᵃ in the same direction and at the same angular velocity. The shaft 42ᵃ is provided with an upward extension 47 carrying a hand wheel 48 by means of which it may be turned, thus raising and lowering the yoke 38 while keeping it always substantially horizontal. The shafts 42 and 42ᵃ preferably are furnished with nuts 49 to prevent them from moving axially relatively to bridge 43. The sprocket chain and the sprocket wheels 44 and 44ᵃ, if desired, may be covered and protected by means of a casing 50.

The bridge member 43 has screw-threaded openings in axial alignment with the bolts 39, and these openings receive locking screws 51 having knurled heads 52. By screwing the parts 51 downwardly until their lower ends engage the tops of the bolts 39, the bar 36 may be clamped rigidly down in its lowermost position so as to prevent any rise of the feed roll 28 relatively to the feed roll shaft support 32.

The brackets 35 which support the shaft 34 are united by a fixed transverse bar 54 having an upwardly directed portion 55 provided with an internally screw-threaded bore which receives the screw-threaded shaft 56 having a hand wheel 57 for turning it. This shaft is furnished with a tailpiece 58 and with a flange 59, the latter forming an abutment for a light, open coiled spring 60 which is centered by means of the tailpiece 58. The opposite end of this spring embraces a stud 61 which projects rearwardly from a downwardly directed extension carried by the bridge member 43.

The feed roll shaft support 32, as above noted, is pivoted on the shaft 34 so that the support with the feed roll may rise and fall, and the weight of the support 32 and the parts associated therewith is ordinarily sufficient to produce the desired work feeding pressure. The spring 60 is a light spring and normally exerts little effect so far as the pressure of the feed roll against the work is concerned, its primary function being to ensure the return of the feed roll support to its normal position if it should be abnormally raised. However, by turning the hand wheel 57, the tailpiece 58 may be brought in contact with the stud 61 so as rigidly to lock the feed roll support against upward swinging movement about the shaft 34.

The axis about which the feed roll support is pivoted, as defined by shaft 34, is spaced a substantial distance (in the direction from which the work advances toward the feed roll) from the axis of the feed roll, and from the vertical plane in which said axis is normally disposed. Thus the feed roll support swings very freely, and rises easily to accommodate work of different thicknesses.

While the springs 37 allow slight upward yield of the feed roll to compensate for irregularities in the work, the maximum feed roll pressure is that due to the weight of the feed roll support, and the pressure is thus substantially constant regardless of the thickness of the work.

The buffing roll shaft 62 is mounted to turn in bushings in bearing bosses 63 and 64 projecting from opposite sides of the main frame 1 of the machine. The bearing 64 is provided with a bushing 65 (Fig. 10). The shaft 62 projects beyond this bushing and is embraced by a freely rotating sleeve 66 which turns in an outboard bearing 69 carried by a bracket 70 (Fig. 1) secured to the right-hand side of the machine frame. The sleeve 66 is furnished at its outer end with a radial, axially elongate slot 66ª which receives a pin 71 fixed in the shaft 62 and projecting at opposite sides of the latter. A collar 72 fixed to the sleeve 66 engages the outer face of the bearing 69, thus retaining the parts in properly assembled relation. A drive pulley 67 is secured to the sleeve 66 by means of a key 68 so that rotation of the pulley turns the sleeve, and thus, by means of the pin 71, turns the shaft 62. Preferably the left-hand end of the sleeve 66, as viewed in Fig. 10, is furnished with an annular recess 68ª for the reception of the right-hand end of the bushing 65.

The slot 66ª is sufficiently long axially of the shaft 62 to permit the shaft to move axially relatively to the sleeve 66 to the desired maximum extent. For reciprocating the buffing roll shaft 62 axially, I prefer to provide each end of the shaft with a cup or conical bearing recess 74 (Fig. 5) which receives a ball bearing 75, the latter also seating in a cup or socket 76 in a plug member 77 coaxial with the shaft 62 at each end of the latter, respectively. To keep the parts in properly aligned relation, as well as to protect the bearings from dirt and to retain lubricant, I preferably surround the bearings by sleeve members 78 which may be held in place by set screws or any other suitable manner.

A vibrator shaft 79 is mounted to slide freely in bearings 80 at opposite sides of the machine-head, and at opposite ends this shaft has fixed thereto rigid bracket arms 81 having head portions 82 which are aligned with and support the plug members 77 at opposite ends respectively of the shaft 62. Preferably in order to take up wear or to provide initial adjustment, the head members 82 of the arms 81 are axially bored and internally screw threaded for the reception of screw-threaded tails 83 of the respective plug members 77, thus allowing the latter to be set up with proper pressure against the ball bearings 75 so as to avoid any lost motion between the reciprocating parts.

The shaft 79 is furnished with a fixed block 84 (Fig. 5) having a vertical recess for the reception of a sliding block 85. A pin 86 projects from this block and has a reduced portion 87 arranged to turn in an eccentric bore in a rotary shaft 88. This shaft 88 is arranged to turn in a bearing 89 carried by a bracket 90 secured to the machine-head. Preferably the shaft 88 has an enlarged portion or collar 91 which bears against the inner face of the bearing 89 so as to limit axial movement of the shaft. A pulley 92 normally turns freely on the shaft 88 and is furnished with a hub 92ª provided with a pair of transverse slots 92ᵇ and 92ᶜ (Fig. 6) disposed substantially at right angles to each other. The rear end of the shaft 88 is furnished with an axial bore 93 which receives the clutch shaft 94 arranged to slide axially in said bore. This clutch shaft is provided with a pin 95 which is adapted to engage either of the slots 92ᵇ or 92ᶜ of the pulley hub and whose ends are arranged to slide in slots 96 in the shaft 88. A collar 97, fixed to the shaft 88 and bearing against the rear face of the hub 92ª of the pulley 92, keeps the parts in properly assembled relation.

The clutch shaft 94 is furnished with a reduced portion 99 to which is secured a hand wheel 98. By pulling this hand wheel rearwardly (or to the right, Fig. 5) shaft 94 is caused to slide axially of the shaft 88 so as to disengage the pin 95 from the slots in the pulley hub. Thus the shaft 88 is unclutched from the pulley at the will of the operator, but may again be caused to rotate with the pulley by pushing the hand wheel 98 forwardly until the pin 95 engages one or the other of the slots or grooves 92ᵇ, 92ᶜ, respectively, in the pulley hub. When the shaft 88 is rotated, the eccentric pin 87 vibrates the block 85 and thus causes the drive shaft 79 to reciprocate axially. This in turn, by means of the arms 81, causes rapid reciprocation of the buffing roll shaft 62.

The pulley 92 is driven by means of a belt 100 (Fig. 8) which passes about a drive pulley 101 turning freely on a stub shaft 102 carried by a sliding arm 103 arranged to slide in bearings 104 in a bracket 105. The arm 103 is furnished with an elongate slot and may be held in adjusted position relative to the bracket 105 by means of a bolt 106. The bracket 105 is furnished with arcuate slots 108 which receive bolts 109 by means of which it may be adjustably secured to the side wall of the main frame 1. A pulley 112 is secured to the pulley 101 so as to turn with the latter, and this pulley 112 is driven by means of a belt 111 which passes about a pulley (not shown) on the main drive shaft 110. By moving the arm 103 in its slide bearings, the tension on the belt 111 may be varied, while by swinging the bracket 105 the tension on the belt 100 may be varied, the stub shaft 102 being adjustable independently in directions substantially at right angles to each other.

The shaft 62 has keyed thereto a buffing roll (Fig. 4) which may be of conventional type, comprising core members 113 suitably hinged together and carrying the resilient cushion surface 114 against which the abrasive material 115, for example sandpaper, is secured.

The machine-head is furnished with an inclined bed portion 116 which supports the inclined work-rest plate 117. This plate may be held in adjusted position by means of screws 118 passing through slots in the plate and into threaded openings in the bed 116 and the plate may be adjusted toward and from the bite of the rolls by means of screws 119. The forward edge of the plate 117 projects up into the angle between the feed roll and the buffing roll, and its under surface preferably is recessed to arcuate form at 120, as shown in Fig. 4, to accommodate the buffing roll. The forward edge of this plate has an upper substantially flat surface to form a support for the work as the latter is advanced between the rolls. It may be noted that the axis of the buffing roll 62 is offset relatively to the axis of the feed roll, the latter being rearwardly of the vertical plane of the axis of the buffing roll, thus conforming to the arrangement disclosed and more fully described in my aforementioned patent.

To prevent injury to the operator as he feeds the work 121 between the feed roll and the buffing roll, I prefer to provide guard means comprising a shaft 122 supported at its opposite ends in brackets 123 (Fig. 3) pivoted at 124 at opposite sides respectively of the machine-head and having arcuate slots 125 receiving adjusting screws 126 by means of which the angular positions of the brackets may be varied. The shaft 122 carries a plate 127 which extends downwardly toward the work support 117 so as to prevent the operator from inserting his fingers into the space between the opposed approaching surfaces of the feed and buffing rolls.

The shaft 20 on which the machine-head is pivoted carries a brush 128 (Fig. 4) for brushing dust from the under surface of the work as the latter leaves the buffing roll. The brush shaft is provided with a drive pulley 129 (Fig. 3) which is driven by means of a belt 130 which passes down and around a pulley (not shown) on the main shaft 110 of the machine.

In order to hold the work down against the upper peripheral surface of this brush 128 where the latter extends up through an opening provided in the upper surface of the machine-head, I provide a hold-down plate 131 which at its opposite ends is provided with apertured bosses for the reception of screws 133 projecting up from the machine-head. Coiled springs 134 embrace these screws and at their lower ends engage the plate 131 and at their upper ends are engaged by adjustable thumb nuts 135 carried by the screws 133. The rear end of the plate 131 is deflected upwardly, as shown at 132, so as to guide the advancing edge of the work downwardly and beneath the plate. Preferably, stop screws 136 are provided to limit downward movement of the plate and thus prevent undue pressure of the latter or of the work against the brush.

It has already been pointed out that the support 32, which carries the feed roll, is pivotally supported on the shaft 34 by means of the ears 33. With this arrangement the axis of the feed roll 27 is disposed at some lateral distance from the axis about which the frame 32 rises and falls and thus the advancing end of a piece of work is able easily and readily to raise the feed roll and the parts associated therewith as the work passes between the feed roll and the buffing roll. This mounting of the feed roll to swing about an eccentric axis makes it much easier for the work to enter beneath it than though the feed roll were arranged to move up and down in vertical guides, and thus facilitates the entrance of very thin and light or very thick material beneath the feed roll. At the same time the fact that the feed roll is urged toward the buffing roll by gravity rather than by spring pressure permits work of substantially different thickness to be buffed without adjustment of the machine parts, it being noted that as the weight of the feed roll and associated parts is constant, substantially the same pressure is exerted on the work regardless of its thickness.

The action is thus quite different from that of mechanism in which the feed roll is forced downwardly by spring pressure, since in the latter case any rise of the feed roll is accompanied by substantially increased pressure necessitating adjustment in order to obtain uniform results. The action of the parts, when a thick piece of work is introduced between the rolls is illustrated in Fig. 9, wherein it will be seen that the feed roll frame 32 has swung upwardly to a slight extent, thus allowing the heavy work 121a to pass beneath the roll. However, this slight movement of the feed roll frame is not sufficient substantially to compress the spring 60 so that the pressure on the work under all conditions is substantially constant.

While the work is passing between the feed roll and the buffing roll, the latter is reciprocated at high speed through a small distance in an axial direction, and thus the desired velvety surface is produced. This reciprocation of the buffing roll does not interfere with the normal drive of the latter, and by the use of the ball bearings 75, forming a part of the reciprocating mechanism, friction is reduced to a minimum. By properly adjusting the plugs 77 all such lost motion between the parts as might cause noise or vibration may be eliminated.

If it be desired to use the machine for buffing counters, in which case it may be desired to use a feed roll having a recessed surface, the screws 51 are screwed down tightly and the hand wheel 57 is advanced until the parts 58 and 61 are in contact, and as thus arranged the feed roll support 32 is prevented from swinging upwardly about its shaft 34, while the boxes 30 which carry the bearings for the feed roll shaft are also locked firmly down. As illustrated in Fig. 1, the entire machine-head may be turned forwardly about the shaft 20 so as to expose the buffing roll for replacement of the abrasive material.

To prevent the feed roll support from dropping too low and thus bringing the feed roll into contact with the buffing roll, I provide the feed roll support with a lug 32a adapted to engage a portion of the machine-head when the support is in normal position, thus limiting downward movement of the support. Likewise, to prevent the machine-head itself from swinging down too far, and to determine its normal position, I provide the upper part of the main frame with a lug 1a having a screw-threaded opening for an adjustable stop screw 1b whose upper end engages the under side of an ear 32b projecting from the machine-head. By turning the screw 1b the normal position of the machine-head, and the spacing of the work plate 117 from the buffing roll may be varied.

While I have illustrated one desirable embodiment of the invention by way of example, I wish it to be understood that my invention is not necessarily limited to the precise details herein disclosed but that other and equivalent arrangements may be employed within the scope of the invention as expressed in the appended claims.

I claim:

1. In a machine of the class described, a buffing roll, and a weighted feed roll operative to press the work into contact with the buffing roll, the axis of the feed roll being offset laterally from the axis of the buffing roll in the direction from which the work approaches and supporting means for the feed roll normally arranged to allow substantially free rise and fall of the feed roll in accordance with variations in the thickness of work introduced between the rolls.

2. In a machine of the class described, a rotary buffing roll, and a rotary feed roll operative to press the work into contact with the buffing roll, means for rotating the buffing roll, a feed roll shaft and means for rotating the latter, a feed roll support provided with bearings for the feed roll shaft, and pivot means for the feed roll support, the pivotal axis of said feed roll support being spaced a substantial distance from the normal vertical plane of the axis of the feed roll shaft in the direction from which the work approaches, said support being substantially free to rise and fall in response to variations in thickness of the work.

3. In a machine of the class described, a rotary buffing roll, and a rotary feed roll operative to press the work into contact with the buffing roll, means for rotating the buffing roll, a feed roll shaft and means for rotating the latter, a feed roll support, pivot means for the feed roll support defining an axis about which said support may swing up and down, vertically movable bearings for the feed roll shaft carried by the feed roll support, and spring means reacting between a part of the feed roll support and said bearings tending to move the bearings and feed roll shaft downwardly, the axis about which the feed roll support swings being disposed at a substantial distance from the normal vertical plane of the feed roll shaft.

4. In a machine of the class described, a rotary buffing roll, and a rotary feed roll operative to press the work into contact with the buffing roll, means for rotating the buffing roll, a feed roll shaft and means for rotating the latter, a movable feed roll support, movable bearings for the feed roll shaft carried by the support, resilient means reacting between the support and bearings tending to move the feed roll shaft toward the buffing roll, and pivot means for the feed roll support, said pivot means defining an axis eccentric to the axis of the feed roll shaft about which the feed roll is substantially free to rise and fall.

5. In a machine of the class described, a rotary buffing roll, and a rotary feed roll operative to press the work into contact with the buffing roll, means for rotating the buffing roll, a feed roll shaft and means for rotating the latter, a movable feed roll support normally tending to move toward the buffing roll under the action of gravity, said feed roll support having movable bearings for the feed roll shaft, and resilient means reacting between the feed roll support and said bearings.

6. In a machine of the class described, a rotary buffing roll, and a rotary feed roll operative to press the work into contact with the buffing roll, means for rotating the buffing roll, a feed roll shaft and means for rotating the latter, a feed roll support, bearings for the feed roll shaft carried by said support, springs interposed between the bearings and said support, said springs being bodily movable with the support, and pivot means for the feed roll support spaced from the axis of the feed roll shaft, said support being substantially free to rise and fall in response to varying thickness of the work, the weight of the feed roll support being sufficient to produce the desired pressure between the feed roll and the work.

7. In a machine of the class described, a buffing roll and a weighted feed roll operative to press the work into contact with the buffing roll, means for rotating the buffing roll, a feed roll shaft and means for rotating the latter, a movable feed roll support provided with movable bearings for the feed roll shaft, said support being free to rise and fall in response to variations in the thickness of the work, said feed roll support being of such weight that gravity urges the feed roll toward the buffing roll with pressure sufficient to produce the desired buffing action on the work, and resilient means reacting between the feed roll shaft bearings and a part of the feed roll support.

8. In a machine of the class described, a buffing roll and a weighted feed roll operative to press the work into contact with the buffing roll, means for rotating the buffing roll, a feed roll shaft and means for rotating the latter, a movable support for the feed roll shaft operative to permit bodily movement of the feed roll toward and from the buffing roll, said support being substantially free to rise and fall in response to varying thickness of the work, and means exerting a substantially constant force in all positions of the feed roll support tending to move the feed roll toward the buffing roll.

9. In a machine of the class described, a rotary buffing roll, a rotary feed roll and a shaft therefor, means for turning the rolls in opposite directions whereby to advance work entered between their opposing surfaces, a normally fixed support for work advancing toward the bite of the rolls, a feed roll support having bearings for the feed roll shaft, and pivot means for the feed roll support spaced a substantial distance from the axis of the feed roll shaft in the direction from which the work is advanced toward the bite of the rolls, the feed roll support being substantially free to rise and fall in response to variations in thickness of the work.

10. In a machine of the class described, a rotary buffing roll, a rotary feed roll and a shaft therefor, means for turning the rolls in opposite directions whereby to advance work entered between their opposing surfaces, a support for work advancing toward the bite of the rolls, a feed roll support having bearings for the feed roll shaft, said support having ears projecting in the direction from which work advances toward the bite of the rolls, said ears having aligned openings therein, and pivot means disposed in said openings and defining an axis about which the feed roll support may rise and fall, the support being free to rise and fall in response to variations in the thickness of the work.

11. In a machine of the class described, a rotary buffing roll, a rotary feed roll and a shaft therefor, means for turning the rolls in opposite directions whereby to advance work entered between their opposing surfaces, a support for work advancing toward the bite of the rolls, a feed roll support having bearings for the feed roll shaft, the vertical plane of the axis of the feed roll shaft being offset in the direction from which the work advances with respect to the vertical plane of the buffing roll axis, and means defining the pivotal axis spaced in the direction from which work advances from the normal plane of the feed roll axis about which the feed roll support may freely rise and fall, said support being substantially free to rise and fall in response to variations in the thickness of the work.

12. In a machine of the class described, a rotary buffing roll, a rotary feed roll operative to press the work into contact with the buffing roll, and a shaft for each of said rolls, means for turning the rolls in opposite directions, a movable feed roll support having bearings for the feed roll shaft, said feed roll support being normally free to rise and fall, thereby carrying the feed roll axis away from and toward the axis of the buffing roll and locking means operative at will to prevent said rise and fall of the feed roll support.

13. In a machine of the class described, a rotary buffing roll, a rotary feed roll operative to press the work into contact with the buffing roll, and a shaft for each of said rolls, means for turning the rolls in opposite directions, a feed roll support having movable bearings for the feed roll shaft, said bearings being normally free to rise and fall relatively to the feed roll support, and locking means operative at will to prevent movement of the feed roll shaft bearings relatively to the feed roll support.

14. In a machine of the class described, a rotary buffing roll, a rotary feed roll operative to press the work into contact with the buffing roll, and a shaft for each of said rolls, means for turning the rolls in opposite directions, a feed roll support having vertically movable bearings for the feed roll shaft, resilient means interposed between the feed roll support and said bearings normally urging the bearings downwardly while permitting the bearings and the feed roll shaft to rise in response to irregularities in the work, and locking means operative to prevent movement of the feed roll shaft bearings relatively to the feed roll support.

15. In a machine of the class described, a rotary buffing roll, a rotary feed roll operative to press the work into contact with the buffing roll, and a shaft for each of said rolls, means for turning the rolls in opposite directions, a movable feed roll support having movable bearings therein for the feed roll shaft, said support being normally free to rise and fall, locking means operative at will positively to prevent rise of the feed roll support, and locking means operative at will to prevent rise of the feed roll shaft bearings relative to the support.

16. A machine for buffing shoe parts, designed to impart a velvety surface to such parts, comprising a buffing roll shaft and a buffing roll thereon, a rotating feed roll operative to press the work into contact with the buffing roll, bearings for the buffing roll shaft arranged to permit the shaft to rotate and to slide axially, means for rotating the shaft, an axially movable vibrator shaft longer than and substantially parallel to the buffing roll shaft, rigid arms fixed to and projecting from said vibrator shaft, said arms being disposed adjacent to opposite ends respectively of the buffing roll shaft, means operative rapidly to reciprocate said vibrator shaft, and means for transmitting movement from said arms to the opposite ends respectively of the buffing roll shaft, whereby to reciprocate the latter in an axial direction.

17. A machine for buffing shoe parts, designed to impart a velvety surface to such parts, comprising a buffing roll and a shaft therefor, a rotating feed roll operative to hold work in operative engagement with the buffing roll, bearings for the buffing roll shaft constructed and arranged to permit the shaft to rotate and to slide axially, means for rotating the shaft, and means operative rapidly to reciprocate the shaft axially while it is rotating, said shaft reciprocating means including an axially movable vibrator shaft substantially coextensive with and parallel to the buffing roll shaft, rigid arms fixed to and projecting from said vibrator shaft, said arms being disposed adjacent to opposite ends respectively of the buffing roll shaft, means for reciprocating said vibrator shaft axially, and anti-friction thrust bearings interposed between the arms and the opposite ends respectively of the buffing roll shaft.

18. A machine for buffing shoe parts, designed to impart a velvety surface to such parts, comprising a buffing roll and a shaft therefor, a rotating feed roll operative to hold work in operative engagement with the buffing roll, bearings for the buffing roll shaft constructed and arranged to permit the shaft to rotate and to slide axially, means for rotating the shaft, and means operative rapidly to reciprocate the shaft axially while it is rotating, said shaft reciprocating means including an axially movable vibrator shaft substantially parallel to the buffing roll shaft, rigid arms fixed to and projecting from opposite ends of said vibrator shaft, said arms being disposed adjacent to opposite ends respectively of the buffing roll shaft, means for reciprocating said vibrator shaft axially, the opposite ends of the buffing roll shaft having cavities therein, and a bearing ball seated in each of said cavities, each of said arms having an element provided with a surface which bears against one of said balls respectively.

19. A machine for buffing shoe parts, designed to impart a velvety surface to such parts, comprising a buffing roll and a shaft therefor, a rotating feed roll operative to hold work in operative engagement with the buffing roll, bearings for the buffing roll shaft constructed and arranged to permit the shaft to rotate and to slide axially, means for rotating the shaft, and means operative rapidly to reciprocate the shaft axially while it is rotating, said shaft reciprocating means including an axially movable vibrator shaft substantially as long as the buffing roll shaft and parallel to the latter, rigid arms fixed to and projecting from opposite ends of said vibrator shaft, said arms being disposed adjacent to opposite ends respectively of the buffing roll shaft, means for reciprocating said vibrator shaft axially, the opposite ends of the buffing roll shaft having cavities therein, each of said arms having an element provided with a cavity disposed opposite to one of the cavities in the respective shaft ends, and ball bearings disposed between the shaft ends and said elements, respectively, said ball bearings being received in the opposed cavities.

20. A machine of the class described comprising a buffing roll and a shaft therefor, means for holding work in operative engagement with the buffing roll, bearings for the buffing roll shaft constructed and arranged to permit the shaft to rotate and to slide axially, means for rotating the shaft, and means operative rapidly to reciprocate the shaft axially while it is rotating, said shaft reciprocating means including an axially movable vibrator shaft substantially as long as and parallel to the buffing roll shaft, arms fixed to and projecting from said vibrator shaft, said arms being disposed adjacent to opposite ends respectively of the buffing roll shaft, means for reciprocating said vibrator shaft axially, each of said arms having an element disposed in axial alignment with one of the buffing shaft ends respectively, said elements being adjustable axially of the shaft and relatively to the respective arms, thereby to take up lost motion between the arms and the shaft.

21. A machine of the class described comprising a buffing roll and a shaft therefor, means for holding work in operative engagement with the buffing roll, bearings for the buffing roll shaft constructed and arranged to permit the shaft to rotate and to slide axially, means for rotating the shaft, and means for reciprocating the shaft axially while it is rotating, said shaft reciprocating means including an axially movable vibrator shaft substantially parallel to the buffing roll shaft, arms fixed to and projecting from said vibrator shaft, said arms being disposed adjacent to opposite ends respectively of the buffing roll shaft, means for reciprocating said vibrator shaft axially, each of said arms having an element in axial alignment with the opposite ends of the buffing roll shaft respectively, an anti-friction bearing interposed between each of said elements and the adjacent end of the shaft, and a sleeve member telescoping over each end of the buffing roll shaft and enclosing the respective anti-friction bearings.

22. A machine for buffing shoe parts, designed to impart a velvety surface to such parts, comprising a buffing roll and a shaft therefor, a rotating feed roll operative to hold work in operative engagement with the buffing roll, bearings for the buffing roll shaft constructed and arranged to permit the shaft to rotate and to slide axially, means for rotating the shaft, and means operative rapidly to reciprocate the shaft axially while it is rotating, said shaft reciprocating means including an axially movable vibrator shaft substantially parallel to the buffing roll shaft, arms projecting from said vibrator shaft, said arms being disposed adjacent to opposite ends respectively of the buffing roll shaft, means for reciprocating said vibrator shaft axially, said means including a clutch element operative at will to stop the axial reciprocation of the buffing roll shaft.

23. A machine for buffing shoe parts, designed to impart a velvety surface to such parts, comprising a buffing roll and a shaft therefor, a rotating feed roll operative to hold work in operative engagement with the buffing roll, bearings for the buffing roll shaft constructed and arranged to permit the shaft to rotate and to slide axially, means for rotating the shaft, and means operative rapidly to reciprocate the shaft axially while it is rotating, said shaft reciprocating means including an axially movable vibrator shaft substantially parallel to the buffing roll shaft, arms projecting from said vibrator shaft, said arms being disposed adjacent to opposite ends respectively of the buffing roll shaft, means for reciprocating said vibrator shaft axially, said means including a rotary shaft provided with an eccentric drive element normally operative to reciprocate the buffing roll shaft axially, and means including a disengageable clutch element for driving said rotary shaft.

24. A machine for buffing shoe parts, designed to impart a velvety surface to such parts, comprising a buffing roll and a shaft therefor, a rotating feed roll operative to hold work in operative engagement with the buffing roll, bearings for the buffing roll shaft constructed and arranged to permit the shaft to rotate and to slide axially, means for rotating the shaft, and means operative rapidly to reciprocate the shaft axially while it is rotating, said shaft reciprocating means including an axially movable vibrator shaft substantially parallel to the buffing roll shaft, arms projecting from said vibrator shaft, said arms being disposed adjacent to opposite ends respectively of the buffing roll shaft, means for reciprocating said vibrator shaft axially, said means including a pair of drive belts extending substantially at right angles to each other, and belt tightener means, including an adjustable stub shaft, operative to vary the tension of each of said belts independently.

25. A machine for buffing shoe parts, designed to impart a velvety surface to such parts, comprising a buffing roll and a shaft therefor, a rotating feed roll operative to hold work in operative engagement with the buffing roll, bearings for the buffing roll shaft constructed and arranged to permit the shaft to rotate and to slide axially, means for rotating the shaft, and means operative rapidly to reciprocate the shaft axially while it is rotating, said shaft reciprocating means including an axially movable vibrator shaft substantially parallel to the buffing roll shaft, arms projecting from said vibrator shaft, said arms being disposed adacent to opposite ends respectively of the buffing roll shaft means for reciprocating said vibrator shaft axially, said vibrator means including a pair of belts extending substantially at right angles to each other, a stub shaft, a pulley for each of said belts mounted on said stub shaft, and a support for said stub shaft, adjustable independently in direction substantially at right angles to each other, whereby to permit independent variation of the tension of said belts.

26. A machine of the class described comprising a buffing roll and a feed roll, a shaft for each roll, bearings in which the buffing roll shaft may turn and also move axially, a sleeve mounted to turn freely on the buffing roll shaft, said sleeve being immovable in an axial direction and having a radial slot of substantially axial length, a drive pulley keyed to the sleeve, a pin projecting from the shaft into the slot in the sleeve, a power driven belt engaging the pulley for rotating the sleeve and shaft, and means engaging the end of the buffing roll shaft and operative to impart axial movement to the latter.

27. A machine of the class described comprising a buffing roll shaft and a roll carried thereby, fixed bearings for the buffing roll shaft, a machine head normally overhanging the buffing roll, pivot means for the head permitting it to be swung away from the buffing roll to give access to the latter, a feed roll support pivoted to the machine head, a rotary feed roll carried by the feed roll support, said support being mounted to permit it to rise and fall freely in response to varying thickness of work interposed between the rolls, and drive means for the feed roll arranged to transmit motion to the latter regardless of the position of the machine head.

WILLIAM M. SPRY.